US008024338B2

(12) United States Patent
Brei

(10) Patent No.: US 8,024,338 B2
(45) Date of Patent: Sep. 20, 2011

(54) SYSTEMS, METHODS, AND INTERFACES FOR REDUCING EXECUTIONS OF OVERLY BROAD USER QUERIES

(76) Inventor: James E. Brei, Milford, MI (US)

(*) Notice: Subject to any disclaimer, the term of this patent is extended or adjusted under 35 U.S.C. 154(b) by 81 days.

(21) Appl. No.: 11/469,434

(22) Filed: Aug. 31, 2006

(65) Prior Publication Data

US 2007/0150439 A1    Jun. 28, 2007

Related U.S. Application Data

(60) Provisional application No. 60/712,761, filed on Aug. 31, 2005.

(51) Int. Cl.
*G06F 17/30* (2006.01)
*G06F 17/00* (2006.01)

(52) U.S. Cl. ........................ 707/736; 707/759
(58) Field of Classification Search .................. 715/848; 707/736, 759
See application file for complete search history.

(56) References Cited

U.S. PATENT DOCUMENTS

| | | | | |
|---|---|---|---|---|
| 5,696,962 | A * | 12/1997 | Kupiec | 707/4 |
| 6,154,213 | A * | 11/2000 | Rennison et al. | 715/854 |
| 6,633,742 | B1 * | 10/2003 | Turner et al. | 434/350 |
| 6,868,525 | B1 | 3/2005 | Szabo | |
| 7,185,006 | B2 * | 2/2007 | Hepner et al. | 707/4 |
| 2003/0126235 | A1 * | 7/2003 | Chandrasekar et al. | 709/220 |
| 2004/0148155 | A1 * | 7/2004 | Vogel | 704/9 |
| 2006/0206455 | A1 * | 9/2006 | Kronberg | 707/3 |

FOREIGN PATENT DOCUMENTS

| | | |
|---|---|---|
| WO | WO 98/49637 A | 11/1998 |
| WO | WO-98/49637 A1 | 11/1998 |
| WO | WO-2007/028021 A2 | 3/2007 |

OTHER PUBLICATIONS

Gale (User Guide Document Version 2.0, 2002, InfoTrac Web).*
"International Search Report for the corresponding PCT Application No. PCT/US2006/034235", (Feb. 22, 2007), 4 pgs.
Guarino, N., et al., "OntoSeek: Content-Based Access to the Web", *IEEE Intelligent Systems*, 14(3), (May 1999), 70-80.
Khan, L. R., "Ontology-Based Information Selection", *Dissertation, Doctor of Philosophy (Computer Science)*, University of Southern California, (2000), 129 pgs.
Khan, Latifur R.; "Ontology-based Information Selection," A Dissertation Presented to the Faculty of the Graduate School, University of Southern California; Aug. 2000; pp. 55-60, 85-86; XP002415961; Retrieved from the Internet: URL:http://utdallas.edu/research/esc/publications/lkhan_def.pdf>.
PCT International Preliminary Report on Patentability for counterpart PCT International Application No. PCT/US/2006/034235; Mar. 4, 2008; 7 pgs; International Bureau of WIPO, Geneva, Switzerland.

* cited by examiner

*Primary Examiner* — James Trujillo
*Assistant Examiner* — Dawaune Conyers
(74) *Attorney, Agent, or Firm* — Edwards Angell Palmer & Dodge LLP

(57) ABSTRACT

The present inventor devised, among other things, an exemplary information retrieval system that promises to reduce the execution of overly broad queries. One exemplary system detects overly broad queries and presents users one or more potentially relevant portions of a hierarchical subject matter classification system, instead of executing the query against the targeted database. The system also presents users the option of accessing one or more relevant documents to the query via an interface for the classification system.

7 Claims, 6 Drawing Sheets

RESPONSE TO SELECTION of PARTICULAR BROAD SUB-TOPIC POST TRAUMATIC STRESS DISORDER

Post Traumatic Stress Disorder (22,788)
Disasters and Emergency Preparedness (4,921)
Rape, Victims of Violence (2,562)
Terrorist, Victims of Violence (1,403)

336D  Veterans (13,902)

(HIGHLIGHT/SELECT BAR)

338A — World War I (209)  339A
338B — World War II (2,421) 339B
338C — Vietnam War (6,789) 339C
338D — Persian Gulf War (4,321) 339D
338E — Foreign Countries (371) 339E View All Titles — 340

344A — Croatian war veterans with post-traumatic stress disorder form national alliance. *Asia Africa Intelligence Wire* Sept 6, 2003 pNA (147 words)

344B — PTSD therapy at VA hospitals raises questions: antipsychotics prescribed at 20% rate. (posttraumatic stress disorder, Veterans Administration)(Psychopharmacology) Sherry Boschert. *Clinical Psychiatry News* August 2003 v31 i8 p30(1) (522 words)

344C — Social context plays key role in treatment of postwar syndromes: perceptions of risk, responsibility. (Practice Trends) Laura Lane. *Clinical Psychiatry News* August 2003 v31 i8 p73(1) (776 words)

344D — Trauma Tx for Vietnam veterans. (Clinical Capsules). (Brief Article) Heidi Splete. *Clinical Psychiatry News* June 2003 v31 i6 p79(1) (154 words)

SYSTEMS, METHODS, AND INTERFACES FOR REDUCING EXECUTIONS OF OVERLY BROAD USER QUERIES

CROSS-REFERENCE TO RELATED APPLICATIONS

This application claims priority to U.S. provisional application 60/712,761 which was filed on Aug. 31, 2005, and which is incorporated herein by reference.

COPYRIGHT NOTICE AND PERMISSION

One or more portions of this patent document contain material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2005, Thomson Global Resources

TECHNICAL FIELD

Various embodiments of the present invention concern information retrieval systems, particularly online information retrieval systems.

BACKGROUND

The growth in popularity of the Internet and other computer networks has fueled not only an increasing availability, but an increasing appetite among consumers for digital information. Consumers typically seek access to this information using an access device, such a computer, to communicate with an online information retrieval system. The information retrieval system typically includes a graphical user interface for entering and submitting requests for information, known as queries, to a remote search engine. The search engine identifies relevant information, typically in the form of documents, and returns a results list to One problem that the present inventor recognized in conventional information retrieval systems concerns users seeking information in fields where they have very little if any knowledge or vocabulary. In this context, these beginning or intermediate users typically enter one or more overly broad searches to glean some insights into a subject area and then enter additional more targeted searches as they iteratively converge on their desired information. Unfortunately, executing these overly broad and the more narrow searches consumes significantly more system resources in terms of search engine capacity and bandwidth in reporting large result sets than necessary.

Moreover, this convergence approach is not successful for all users. Some unknowingly end up jumping between subject areas, become contextually lost, and never converging to the desired information. Often, this means that they consumed significant system resources, and left unsatisfied.

Conventional techniques for handling large numbers of queries generally entail adding search engine capacity. However, adding capacity is not only expensive, but ignores the issue of inefficient usage of the system. To address the inefficiency of overly broad queries, some systems screen queries and warn when large results sets are likely. Users are then either encouraged or forced to define a more narrow query. However, this ignores the fact that the many users lack the subject-matter expertise they need to define effective narrower queries and will likely execute even more queries to find their desired information, if at all.

Accordingly, the inventor has identified a need to further improve how information retrieval systems handle overly broad queries.

SUMMARY

To address this and/or problems, the present inventor devised, among other things, information retrieval systems, methods, software, and related interfaces that promise to reduce the execution of overly broad queries while improving the likelihood that users find the information they want. One exemplary system detects overly broad queries and presents users one or more potentially relevant portions of a topical classification system, without having executed the query against the targeted database. Each portion of the topical classification system is presented with an indication of the number of documents associated with it and a listing of one or more of its most popular documents. The system also presents users the option of accessing one or more of the most popular documents or retrieving the entire set of documents for the portion. It is expected that users may find the information they need in one of the most popular documents or learn enough from one or more of the most popular documents to define a more targeted query.

BRIEF DESCRIPTION OF THE DRAWINGS

FIG. 3C is a facsimile of a graphical user interface 500 which corresponds to one or more embodiments of the invention.

DETAILED DESCRIPTION OF EXEMPLARY EMBODIMENT(S)

This description, which not only references and incorporates the above-identified Figures, but also incorporates the appended claims, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Exemplary Information-Retrieval System

Figure 1:
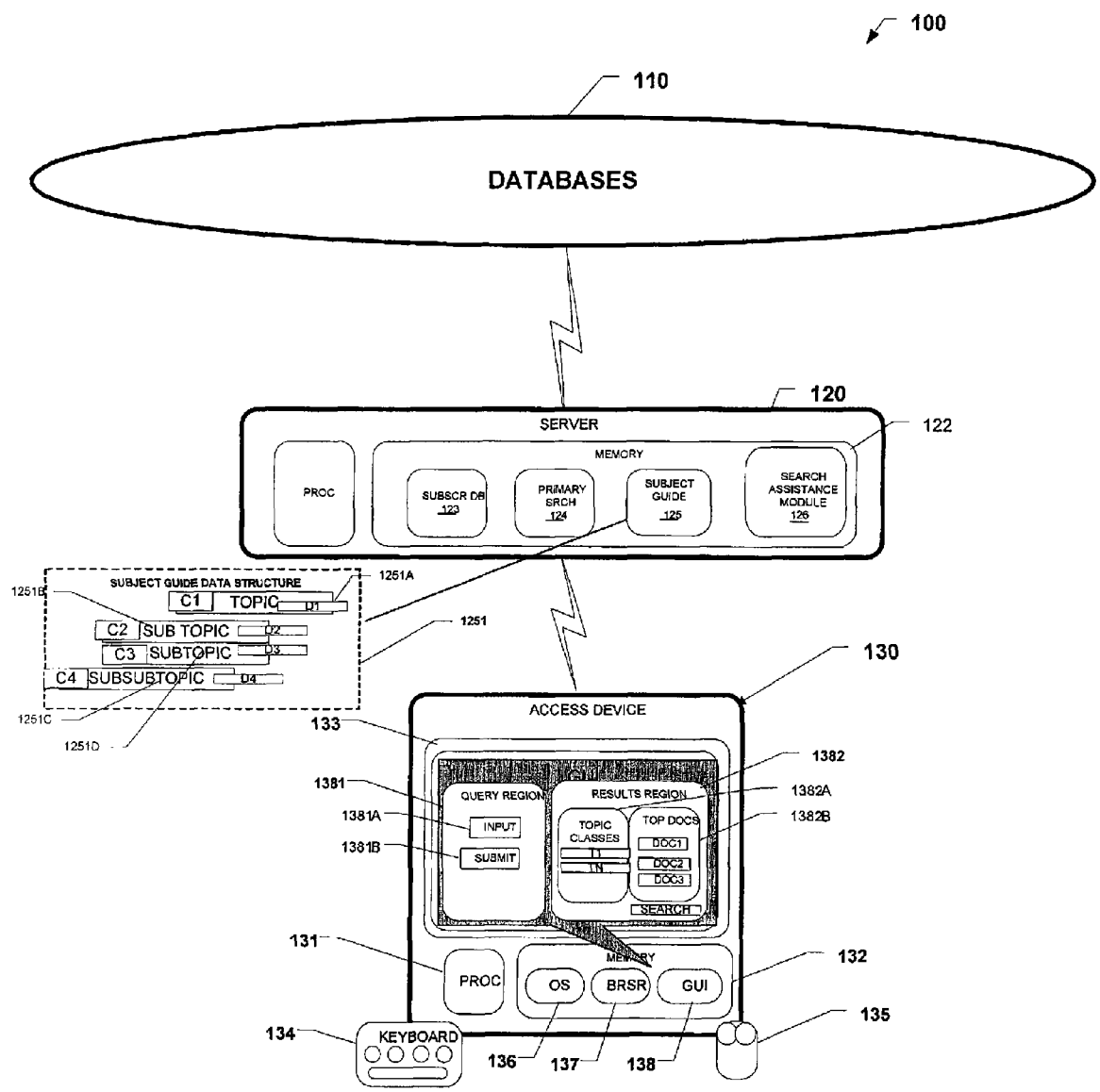
FIG. 1 is a block diagram of an exemplary information retrieval system 100 which corresponds to one or more embodiments of the invention.

FIG. 1 shows an exemplary online information-retrieval system 100, which may be adapted to incorporate the capabilities or functions described above. System 100 includes one or more databases 110, one or more servers 120, and one or more access devices 130.

Databases 110 includes one or more separate databases, which take the exemplary form of one or more electronic, magnetic, or optical data-storage devices, include or are otherwise associated with respective indices (not shown). Each of the indices includes terms and phrases in association with corresponding document addresses, identifiers, and other conventional information. In some embodiments, databases 110 includes documents related to caselaw, statutes, financial, scientific, health-care information. Still other embodiments provide public or private databases, such as those made available through INFOTRAC. Databases 110 are coupled or couplable via a wireless or wireline communications network, such as a local-, wide-, private-, or virtual-private network, to server 120.

Server 120, which is generally representative of one or more servers for serving data in the form of webpages or other markup language forms with associated applets, ActiveX controls, remote-invocation objects, or other related software and data structures to service clients of various "thicknesses." More particularly, server 120 includes a processor module 121, a memory module 122, a subscriber database 123, a search module 124, classification data module 125, and a search assistance module 126.

Processor module 121 includes one or more local or distributed processors, controllers, or virtual machines. In the exemplary embodiment, processor module 121 assumes any convenient or desirable form.

Memory module 122, which takes the exemplary form of one or more electronic, magnetic, or optical data-storage devices, stores subscriber database 123, primary search module 124, class data module 125, and search-assistance module 126.

Subscriber database 123 includes subscriber-related data for controlling, administering, and managing pay-as-you-go or subscription-based access of databases 110. In some database 123 includes user-specific information regarding passwords and user preferences.

Search module 124 includes one or more search engines and related user-interface components, for receiving and processing user queries against one or more of databases 110. In the exemplary embodiment, one or more search engines associated with search module 124 provide Boolean, tf-idf, natural-language search capabilities.

Subject guide module 125 includes one or more classification data sets which are descriptive of contents of one or more of databases 110. In the exemplary embodiment, data module 125 includes one or more subject guide data structures, such as representative subject guide data structure 1251. Data structure 1251 includes a top-level topic identifier 1251A which is logically associated with mid-level topic identifiers 1251B and 1251C, and bottom-level topic identifier 1251D. Topic identifiers 1251A, 1251B, 1251C, and 1251D are logically associated with respective sets of document identifiers D1, D2, D3, and D4, each of which identify up to four most relevant, popular, or recent documents for the corresponding topic in the exemplary embodiment. Additionally, each of the topic identifiers 1251A-1251D are associated with respective document counts C1-C4, which indicate the respective number of documents associated with the topic identifiers. (In some embodiments, the topical hierarchy of the subject guide and thus its corresponding data structures is more than three levels deep. In the exemplary embodiment, top-level topics correspond to overly broad queries; mid-level topics correspond to broad queries, and bottom-level identifiers correspond to narrow searches.)

Search-assistance module 126 includes machine readable and/or executable instruction sets for detecting or sensing the breadth of a user query and presenting classification data and related user interfaces and selection options as further described below, over a wireless or wireline communications network on one or more accesses devices, such as access device 130.

Access device 130 is generally representative of one or more access devices. In the exemplary embodiment, access device 130 takes the form of a personal computer, workstation, personal digital assistant, mobile telephone, or any other device capable of providing an effective user interface with a server or database. Specifically, access device 130 includes a processor module 131 one or more processors (or processing circuits) 131, a memory 132, a display 133, a keyboard 134, and a graphical pointer or selector 135.

Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, and a graphical user interface (GUI) 138. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of GUI 138 on display 133. Upon rendering, GUI 138 presents data in association with one or more interactive control features (or user-interface elements). (The exemplary embodiment defines one or more portions of interface 138 using applets or other programmatic objects or structures from server 120 to implement the interfaces shown above or elsewhere in this description.)

In the exemplary embodiment, each of these control features takes the form of a hyperlink or other browser-compatible command input, and provides access to and control of query region 1381 and search-results region 1382. User selection of the control features in region 1382 results in retrieval and display of at least a portion of the corresponding document within a region of interface 138 (not shown in this figure.) Although FIG. 1 shows region 1381 and 1382 as being simultaneously displayed, some embodiments present them at separate times.

Exemplary Method(s) of Operation

Figure 2:
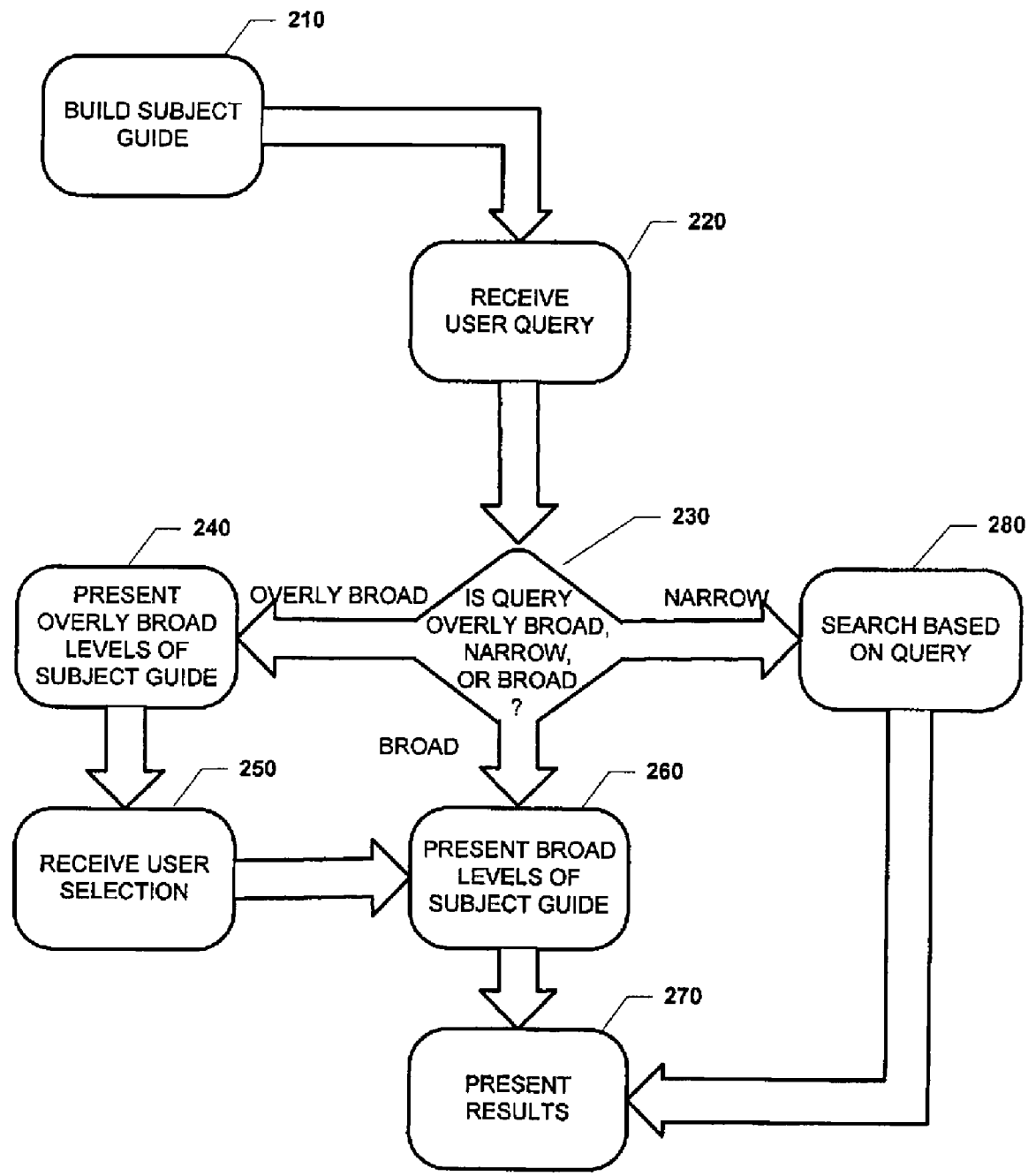
FIG. 2 is a flow chart of an exemplary method of operation which corresponds to one or more embodiments of the invention.

FIG. 2 shows a flow chart 200 of one or more exemplary methods of operating an information-management system, such as system 100. Flow chart 200 includes blocks 210-270, which are arranged and described in a serial execution sequence in the exemplary embodiment. However, other embodiments execute two or more blocks in parallel using multiple processors or processor-like devices or a single processor organized as two or more virtual machines or sub processors. Other embodiments also alter the process sequence or provide different functional partitions to achieve analogous results. For example, some embodiments may alter the client-server allocation of functions, such that functions shown and described on the server side are implemented in whole or in part on the client side, and vice versa. Moreover, still other embodiments implement the blocks as two or more interconnected hardware modules with related control and data signals communicated between and through the modules. Thus, the exemplary process flow applies to software, hardware, and firmware implementations.

In block 210, the exemplary method begins with collecting subject matter information for one or more databases. In the exemplary embodiment, this entails using subject and phrase classification or categorization technology to identify the four most relevant or popular documents for each subject and authority term. Additionally, a total number of relevant documents would be identified. Some embodiments may identify alternative numbers of documents. Popularity in some instances is defined in terms of number of user retrievals, views, cumulative view time, votes, or ranked scores.

During the indexing process a categorization tool using key phrase technology builds a subject guide where the 4 most relevant and 4 most recent document ids were cached with the subject term. Additionally, a comprehensive number of document for each guide class or topical category is cached. Two arbitrary or empirically determined lines are then "drawn" vertically through the subject guide, where terms on the left of the lines are deemed "overly-broad", terms in the middle of the two lines are deemed broad, and terms on the right deemed narrow. Thus, for example, for a given topic branch in the subject guide, the exemplary embodiment predetermines which levels of the subject matter hierarchy are overly broad, which levels are broad, and which levels are narrow. In some embodiments the determination is based on the number of documents in each level. Execution continues at block 220.

Block 220 entails receiving a user query. In the exemplary embodiment, this entails a user using a browser application to couple her access device to server 120, logging into the system using appropriate login credentials. With successful login, server 120 outputs one or more instructional or programmatic elements to define a graphical use interface, such as interface 138, on a display associated with the access device. The user then defines and submits a query, such "psychology", which is overly broad, via interface 138 to server 120. Execution then proceeds to block 230.

Block 230 entails determining whether the query is overly broad, broad, or narrow based on how it relates to the subject guide. To this end, the exemplary embodiment first determines whether the query (terms or phrases) maps to one or more major levels or nodes of the subject guide using ontology technology. If the query is related to two or more of the major levels (or unrelated classes), it is deemed overly broad and execution branches to block 240, which entails presenting a list of subjects, more precisely a list of subjects predetermined to be overly broad but relevant to the query.

Figure 3A:
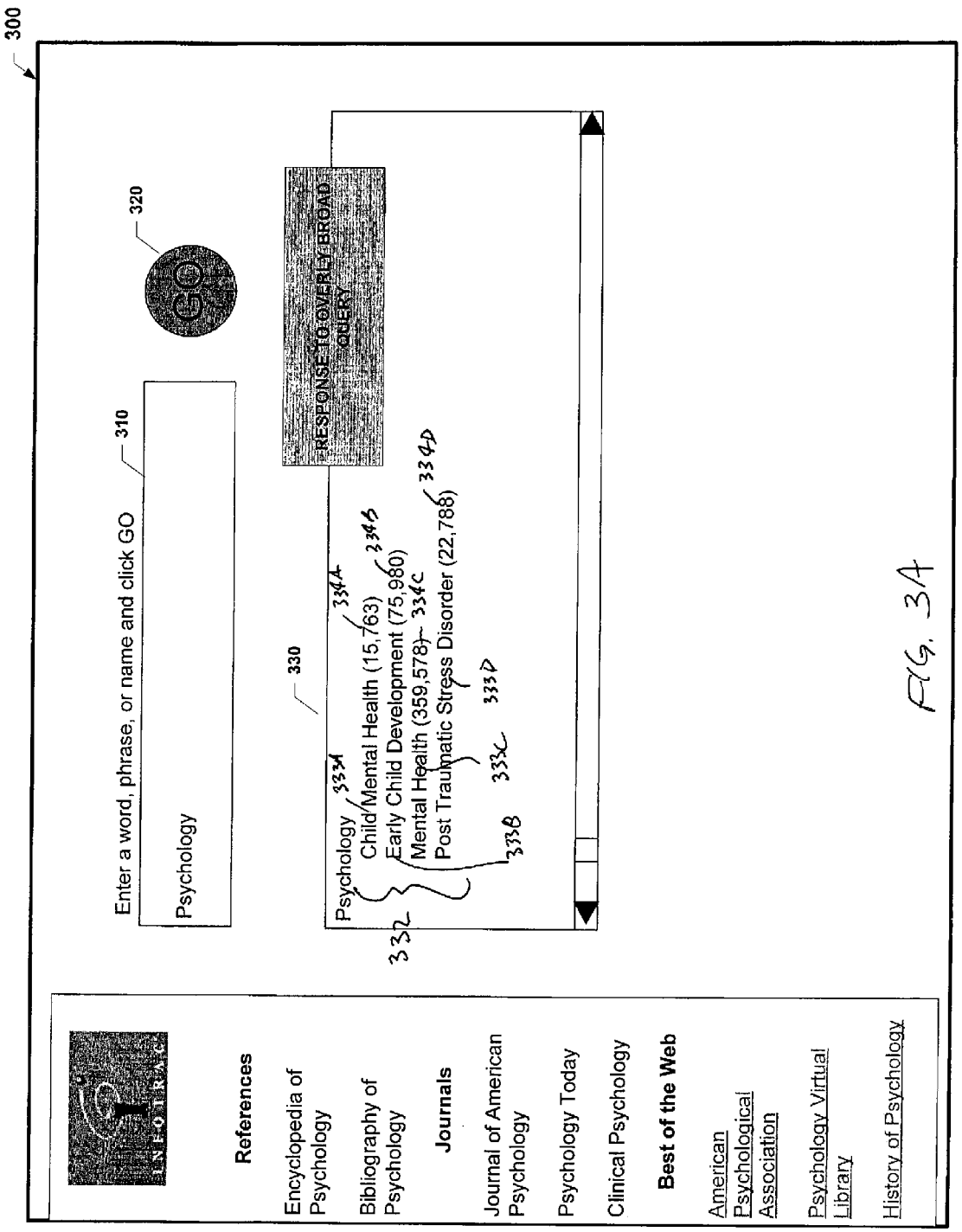
FIG. 3A is a facsimile of a graphical user interface 300 which corresponds to one or more embodiments of the invention.

FIG. 3A shows an exemplary interface 300 which can be used in place of interface 138 in FIG. 1. Interface 300 includes a query definition region 310, a query submission feature 320, and a results region 330. Query definition region 310 accepts query text input from a user. Query submission feature 320 is selectable to cause submission of the query text or more generally the contents of region 310 to a server, such as server 120. (In some embodiment, one or more portion of the search assistance software and the subject guide are stored locally on access device 130 rather than server 120.) Per the psychology query example, results region 330 displays a list 332 of user selectable subtopics 333A, 333B, 333C, and 333D, which are associated with respective document counts 334A, 334B, 334C, and 334D. the document counts indicate the number of documents (articles or hits) associated with the corresponding subtopic.

FIG. 2 shows that after presentation of the overly broad levels in block 240, execution proceeds to block 250, which entails receiving a user selection of one of the presented overly broad levels (or topics) of the subject guide. With user selection, execution advances to block 260.

Figure 3B:
FIG. 3B is a facsimile of a graphical user interface 400 which corresponds to one or more embodiments of the invention.

Block 260 entails presenting one or more broad levels of the subject guide that are associated with the selected overly broad level. FIG. 3B shows broad topic levels 336A, 336B, 336C, and 336D (which constitute a lower level subject matter list) and respectively associated document counts 337A, 337B, 337C, and 337D. Execution continues at block 270.

Block 270 entails presenting one or more search results for the selected overly broad level. In the exemplary embodiment, this entails presenting selectable identifiers (for example hyperlinked citations) for the four most relevant documents 341A-341D that are associated with the selected overly broad topic in the subject guide. As noted in the description of system 100, some embodiments use the four most recent or most popular document identifiers Top documents region 340 lists a number of the most relevant, most popular, or most recent documents that are cached in the subject guide for the selected overly broad level.

FIG. 3C shows that the user can further select one of the broad top levels, such as broad topic level 336D (Veterans) and cause display of narrow topic levels 338A, 338B, 338C, 338D, and 338E and four most relevant documents 344A-344D that are associated with the Veterans topic level in the subject guide. Additionally, document counts 339A, 339B, 339C, 339D, and 339E are respectively presented in association with narrow topic levels 338A-338E.

Figure 3D:
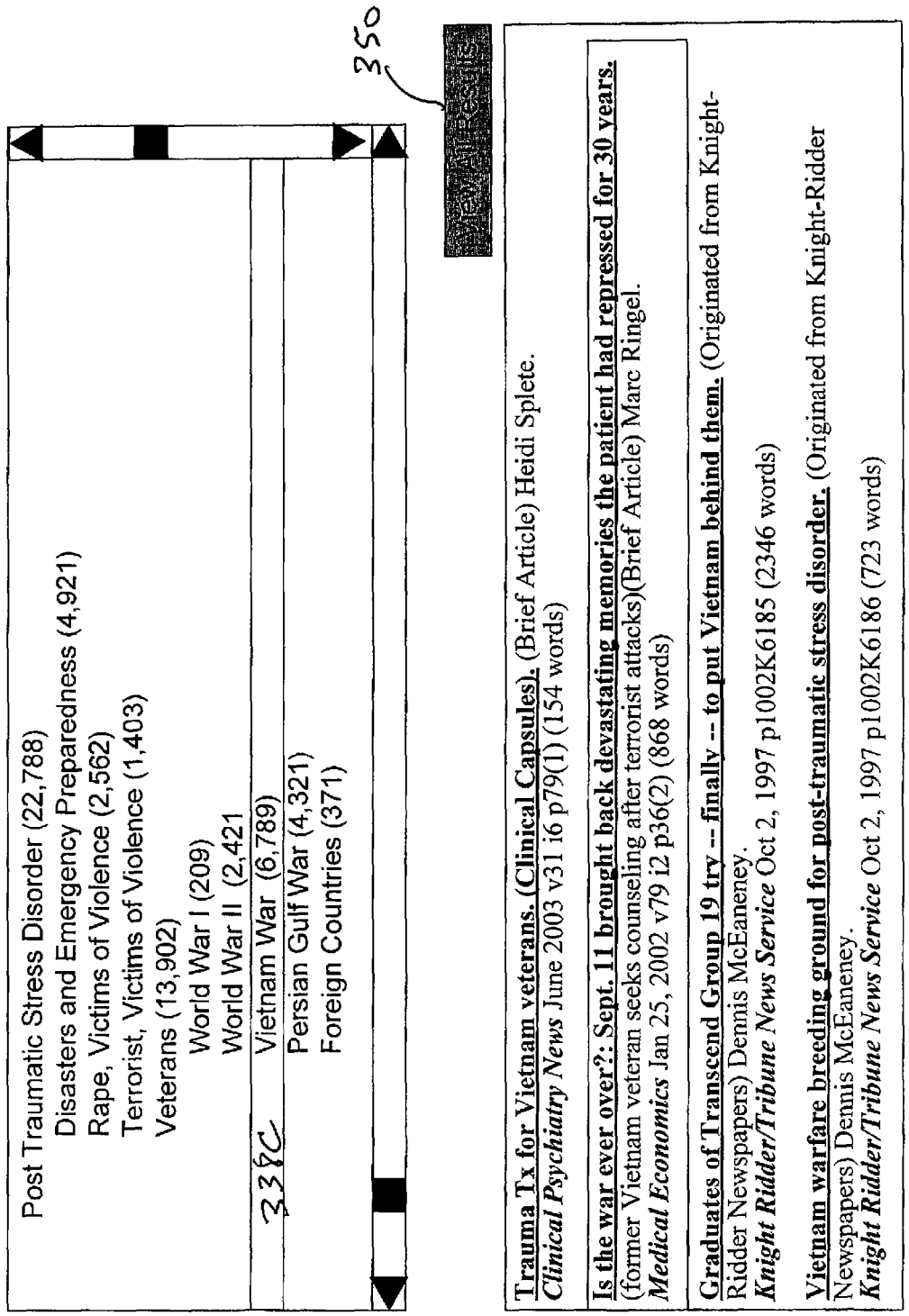
FIG. 3D is a facsimile of a graphical user interface 600 which corresponds to one or more embodiments of the invention.

Similarly, FIG. 3D shows that the user can navigate to narrow topic 338C (Vietnam War) and cause display of the four most relevant documents 346A-346D. At this point there are several options: select/mark one or more of the four most relevant articles and perform email, save, or view operations; double click an article and view the article (document); save the search which allows for passive (when the user returns a single click hot button takes them to a results page) and active (sends an alert) automation; click on the View All Results button 350 to view a typical results screen. In the exemplary embodiment, this is the only time a search is executed against the databases, unless the query is deemed to be narrow at block 230 (in FIG. 2), in which case execution would branch to block 280 to execute the query conventionally.

More generally, interface 300 enables a user to visually inspect how system 100 will respond to a query by viewing the subject guide and relevant documents without the system actually executing the user's query. The user can broaden or narrow their context by navigating through the subject list. When the user is confident that the subject, relevant results and total number of relevant documents are satisfactory, they can select one of the relevant documents and complete their session, without having executed a search, or the can choose to execute the search and view the total number of documents. This approach eliminates overly-broad searches and, more generally significantly reduces the total number of searches. More importantly, it reduces the vocabulary barrier that most beginning and intermediate users experience with search technology.

CONCLUSION

The embodiments described above are intended only to illustrate and teach one or more ways of making and using the present invention, not to restrict its breadth or scope. The actual scope of the invention, which embraces all ways of practicing or implementing the teachings of the invention, is defined only by one or more issued patent claims and their equivalents.

The invention claimed is:

1. A computer-implemented method for reducing execution of overly broad user queries, the method comprising the steps of:
providing a database containing information organized into classes according to a subject matter classification system;
building a hierarchical subject guide relating to a class of information within the subject matter classification system, the hierarchical subject guide including a plurality of topic levels;
categorizing each of the topic levels relating to the specific class of information as either overbroad, broad, or narrow;
receiving a query from an access device having a display;
mapping the received query to one or more of the topic levels and designating the query as either overbroad, broad, or narrow without executing the query against the database;
displaying a portion of the hierarchical subject guide that corresponds to the topic level to which the query has been mapped without executing the query against the database when the query is designated as either overbroad or broad, wherein the portion of the hierarchical subject guide that corresponds to the topic level is displayed together with a plurality of document identifiers, wherein each document identifier is linked to one of the plurality of documents related to the topic level; and
executing the query against the database and displaying the results when the query is designated as narrow
wherein each of the above steps are carried out using a computer.

2. The method of claim 1, wherein the step of displaying a portion of the hierarchical subject guide includes displaying a user-selectable topic level indicator as well as a plurality of user-selectable sub-topic level indicators.

3. The method of claim 2, further comprising displaying a first set of document identifiers associated with a first sub-topic level indicator when a user selects the first sub-topic indicator and displaying a second set of document identifiers associated with a second sub-topic level indicator when a user selects the second sub-topic level indicator.

4. The method of claim 1, wherein displaying at least a portion of the hierarchical subject guide includes displaying first and second user selectable subject matter identifier and respective first and second document count indicators, wherein selection of one of the first and second subject matter identifiers causes display of one or more document identifiers associated with the one of the first and second subject matter identifiers.

5. The method of claim 1, wherein displaying at least a portion of the hierarchical subject guide includes displaying a subject matter identifier and a document count indicator.

6. An information retrieval system comprising:
a search module running on a server and interfacing with a database;
an access device including a graphical user interface in communication with the search module to receive queries from a user and present search results to the user;
a subject guide module having a classification data set descriptive of the contents of the database;
a search-assistance module in communication with the subject guide module and configured to categorize each level of the classification data set as either overly broad, broad, or narrow, and configured to categorize a user query as either overly broad, broad, or narrow, without executing the query against the database;
a query definition region forming part of the graphical user interface;
a hierarchical subject matter guide region forming part of the graphical user interface, the hierarchical subject matter guide region including a broad topic level display area configured to display a user selectable broad subject matter identifier and corresponding document count indicator that indicates the corresponding number of documents in the database associated with the selectable subject matter identifier, the hierarchical subject matter guide region also including a narrow level topic display area configured to display a plurality of selectable narrow subject matter identifiers and corresponding document count indicators, wherein the narrow subject matter identifiers correspond to subtopics of the broad subject identifier; and
a document identifier display region forming part of the graphical user interface and configured to be displayed simultaneously with the hierarchical subject matter guide and the query definition region, wherein the document display region simultaneously displays one or more user selectable document identifiers in response to selection of one of the broad subject matter identifier and the narrow subject matter identifiers, wherein each user selectable document identifiers is selectable to invoke retrieval of a corresponding document related by subject matter to the subject matter identifiers.

7. The information retrieval system of claim 6, wherein the query definition region is operably coupled to the search assistance module, wherein the search assistance module activates display of the hierarchical subject matter guide region in response to a determination that the query is too broad.

* * * * *